(12) United States Patent
Stroschke et al.

(10) Patent No.: US 12,521,682 B2
(45) Date of Patent: Jan. 13, 2026

(54) ULTRASONICALLY SURFACE MODIFIED POLYETHERSULFONE MEMBERS AND METHOD OF MAKING THEREOF

(71) Applicant: Solventum Intellectual Properties Company, Maplewood, MN (US)

(72) Inventors: Mathias Stroschke, Sprockhövel (DE); Stefan Weuster, Remscheid (DE)

(73) Assignee: Thermo Fisher Bioprocessing Inc., Waltham, MA (US)

( * ) Notice: Subject to any disclaimer, the term of this patent is extended or adjusted under 35 U.S.C. 154(b) by 578 days.

(21) Appl. No.: 17/785,337

(22) PCT Filed: Dec. 14, 2020

(86) PCT No.: PCT/IB2020/061915
§ 371 (c)(1),
(2) Date: Jun. 14, 2022

(87) PCT Pub. No.: WO2021/124082
PCT Pub. Date: Jun. 24, 2021

(65) Prior Publication Data
US 2023/0028271 A1    Jan. 26, 2023

(30) Foreign Application Priority Data
Dec. 17, 2019 (EP) .................................. 19217219

(51) Int. Cl.
*B01D 67/00* (2006.01)
*B01D 71/68* (2006.01)

(52) U.S. Cl.
CPC .......... *B01D 67/009* (2013.01); *B01D 71/68* (2013.01); *B01D 2323/28* (2013.01); *B01D 2325/02* (2013.01)

(58) Field of Classification Search
CPC ............ B01D 2323/28; B01D 2325/02; B01D 61/145; B01D 67/0083; B01D 67/009; B01D 71/68
See application file for complete search history.

(56) References Cited

U.S. PATENT DOCUMENTS 4,487,717 A * 12/1984 Oyama ................ C07K 5/0613
260/1
4,830,753 A * 5/1989 Cabral ................... C12M 33/14
210/663

FOREIGN PATENT DOCUMENTS

CN        105597562         5/2016
CN        108786503 A   *  11/2018

* cited by examiner

*Primary Examiner* — Dirk R Bass
(74) *Attorney, Agent, or Firm* — HYLTON-RODIC LAW PLLC

(57) ABSTRACT

The present disclosure provides a method for treating the surface of a microporous polymeric membrane, comprising immersing a microporous polymeric membrane in a liquid; and applying ultrasonic waves to the microporous polymeric membrane immersed in the liquid.

14 Claims, 1 Drawing Sheet

2 µm

ULTRASONICALLY SURFACE MODIFIED POLYETHERSULFONE MEMBERS AND METHOD OF MAKING THEREOF

CROSS REFERENCE TO RELATED APPLICATIONS

This application is a national stage filing under 35 U.S.C. 371 of PCT/IB2020/061915, filed Dec. 14, 2020, which claims the benefit of European Application No. 19217219.5, filed Dec. 17, 2019, the disclosure of which is incorporated by reference in its/their entirety herein.

FIELD

The present disclosure relates to a process for treating the surface of polymeric membranes comprising the use of ultrasonic waves. The present disclosure further relates to polymeric membranes obtained by this process and the use of the polymeric membranes for filtration and purification of liquid media.

BACKGROUND

Polymer membranes are employed in a very wide range of different industrial, pharmaceutical or medical applications for precision filtration. In these applications, membrane separation processes are gaining in importance, as these processes offer the advantage that the substances to be separated are not thermally burdened or even damaged. Ultrafiltration membranes can be employed for the removal or separation of macromolecules. Numerous further applications of membrane separation processes are known from the beverages industry, biotechnology, water treatment or sewage technology. Such membranes are generally classified according to their retention capacity, i.e. according to their capacity for retaining particles or molecules of a certain size, or with respect to the size of the effective pores, i.e. the size of the pores that determine the separation behaviour. For example, ultrafiltration membranes thereby cover the size range of the pores determining the separation behaviour between roughly 0.01 and approx. 0.1 µm, so that particles or molecules with a size in the range larger than 20 000 or larger than approx. 200 000 Daltons can be retained.

A further distinction between the membranes can be made with respect to the pore structure of the membranes, i.e. with respect to the size of the pores over the membrane wall. Here a distinction can be made between symmetric membranes, i.e. membranes in which the pore size on both sides of the membrane wall is essentially the same, and asymmetric membranes in which the pore size on the two sides of the membrane is different. Asymmetric membranes generally have a separating layer with a minimal pore size that determines the separation characteristics of the membrane, and adjoining the separating layer a supporting layer with larger pores that is responsible for the mechanical stability of the membrane. An integrally asymmetric membrane is understood to be one having at least one separating layer and one supporting layer, the separating and supporting layers consisting of the same material and being formed simultaneously during the production of the membrane. As a result, both layers are bound together as an integral unit. At the transition from the separating layer to the supporting layer there is merely a change with respect to the membrane structure. Integrally asymmetric membranes and methods for their production are described e.g. in EP 0361 085 B1.

In contrast to integrally asymmetric membranes, composite membranes have a multilayer structure resulting from the fact that a separating layer is applied to a previously produced (micro)porous supporting layer or supporting membrane in a subsequent, i.e. separate, process step such as coating with a film-forming polymer, or grafting with a monomer forming this polymer. As a result, the materials forming the supporting layer and the separating layer in composite membranes also have different properties. At the transition from the separating layer to the supporting layer there is therefore an inhomogeneity with respect to the material forming the membrane in composite membranes.

In order to be able to perform microfiltration applications cost-effectively, membranes are required that exhibit high filtration rates. In order to achieve these high filtration capacities, the membranes are generally subjected to high pressures. An essential criterion for the evaluation of the membranes is therefore their permeability or transmembrane flow, with the permeability being defined as the volume of fluid passing through the membrane per unit of area of the membrane, and per unit of time and pressure. In addition, the mechanical strength or stability of the hollow fiber membrane is an important evaluation criterion.

Furthermore, in typical biopharmaceutical and industrial applications membrane capacity plays an important role since it determines the load of rejected particles or molecules a membrane can be exposed to before a significant decrease of permeate flow occurs. Hence, high capacities are very desirable since downtimes for filter replacements are reduced and permeate production per filter is increased.

Accordingly, there have been some efforts in industry and science to increase the capacity of existing membranes. Modification of existing material will yield in pore structures. For example, EP 1140332 discloses that membrane microfilters may be formed in situ in a defined region of a blank by embossing one surface a defined region of the blank to provide an array of indentations, and ablating the material of the blank in the defined region until the indentations become through pores. Ablation is described as being carried out by various means such as chemical etching or laser ablation.

In summary, there exists a need in the art to provide membranes suitable for biopharmaceutical and industrial purposes having high capacity, without sacrificing other desirable properties such as good separation capability, high trans membrane flow, and good mechanical stability of the membrane.

SUMMARY

The present disclosure provides a method for treating the surface of a microporous polymeric membrane, comprising
 (i) Immersing a microporous polymeric membrane in a liquid;
 (ii) Applying ultrasonic waves to the microporous polymeric membrane immersed in the liquid.

The present disclosure further provides a polymeric microporous membrane, obtained by the method according to any one of the preceding claims.

Furthermore, the present disclosure relates to certain uses of the membranes obtained in the method as described herein in applications filtration of aqueous liquids, in particular in the biopharmaceutical industry, or in the production of beverages.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. As used herein, the term "a", "an", and "the" are used interchangeably and mean one or more; and "and/or" is used to indicate one or both stated cases may occur, for example A and/or B includes, (A and B) and (A or B). Also herein, recitation of ranges by endpoints includes all numbers subsumed within that range (e.g., 1 to 10 includes 1.4, 1.9, 2.33, 5.75, 9.98, etc.). Also herein, recitation of "at least one" includes all numbers of one and greater (e.g., at least 2, at least 4, at least 6, at least 8, at least 10, at least 25, at least 50, at least 100, etc.). Also, it is to be understood that the phraseology and terminology used herein is for the purpose of description and should not be regarded as limiting. Contrary to the use of "consisting", which is meant to be limiting, the use of "including," "containing", "comprising," or "having" and variations thereof is meant to be not limiting and to encompass the items listed thereafter as well as additional items.

Amounts of ingredients of a composition may be indicated by % by weight (or "% wt". or "wt.-%") unless specified otherwise. The amounts of all ingredients gives 100% wt unless specified otherwise. If the amounts of ingredients is identified by % mole the amount of all ingredients gives 100% mole unless specified otherwise.

Parameters as described herein may be determined as described in detail in the experimental section.

Unless explicitly indicated, all preferred ranges and embodiments may be combined freely.

The present disclosure provides a method for treating the surface of a microporous polymeric membrane, comprising
  (i) Immersing a microporous polymeric membrane in a liquid;
  (ii) Applying ultrasonic waves to the microporous polymeric membrane immersed in the liquid.

The method as described herein allows for an easy, safe and efficient modification of the surface of a microporous membrane in that the surface porosity is increased, without adversely affecting other properties such as trans membrane flow, separation capability and mechanical stability of the membrane. The increase in surface porosity has the effect of an increased membrane capacity. Also, the immersion of microporous membranes in fluids is already part of common manufacturing methods for membranes, indeed, often in one of the final production steps. Typically, in modern industrial membrane manufacture, continuous methods are used, and the membranes are led through at least one washing bath. Application of the method as described herein is easily carried out, without involving additional chemistry, expensive machinery or any additional steps. Also, the application of ultrasonic waves is well understood, and means for generation of ultrasonic waves, even for industrial applications, are readily commercially available. Hence, the method as described herein is easily implemented into existing methods of manufacturing membranes on an industrial scale.

As commonly known, the application of ultrasonic waves to liquids as ins in step (ii) of the method as described herein comprises the induction of cavitation in the liquid. It is also known that the phenomenon of cavitation involves evaporation of liquid in very small and localized spots. These microscale steam bubbles collapse after only a few microseconds and create so-called micro-jets that are able to mechanically erode solid surfaces. Without wanting to being bound by theory, it is believed that these phenomenon typically involved in cavitation are responsible for opening up existing pores on the surface of microporous polymeric membranes, or even open new pores in said surfaces. Since it was found that the effect of opening up or creating pores only on the surface or near-surface of microporous polymeric membranes by application of ultrasonic waves as described herein, it is also assumed that the porous structure of the membrane damps the ultrasonic waves to some extent. Thereby, the effect as described herein is contained in the surface-region of the membranes.

With regard to the liquid used in the method according to the present disclosure, basically any liquid may be used, if it is able to yield cavitation, and does not otherwise harm or dissolve the membrane immersed therein. Preferably, the liquid is selected from organic liquids and/or water. Since water fulfils all criteria for suitability in the method as described herein, it is preferred that the liquid used herein comprises water. As already discussed, since common industrial membrane manufacturing processes typically involve washing or rinsing baths at the end of the process line, it is preferred that the liquid used in the method as described herein essentially comprises water. That is, pure water such as potable water or tap water as commonly used in washing or rinsing baths may be used advantageously in the method as disclosed herein. The organic liquid may be selected from organic solvents, glycerols and/or oils. Admixing organic solvents, glycerols and/or oils to water so as to form the liquid as described herein has the effect that the cavitation when applying the ultrasonic waves may be tailored to the actual needs to some extent. For example, admixing glycerol may dampen down the cavitation, which may be desirable when a strong ultrasonic generator is being used in combination with a particularly sensitive microporous polymeric membrane. Preferably, the oil is selected from mineral oil, synthetic oil, vegetable oil, preferably olive oil, rape seed oil, sunflower seed oil, and/or linseed oil. In a preferred example of the method according to the present disclosure, the liquid comprises water and glycerol. This mixture was found to provide favourable results in that cavitation may be tailored to present needs. When using a mixture of water, glycerol and/or oil as liquid in the method as described herein, it is preferred that the liquid comprises water and at least 1 vol-% glycerol and/or oils, preferably at least 2 vol-% glycerol and/or oils, and more preferably at least 5 vol-% glycerol and/or oils. Preferably, the liquid comprises water and up to 50 vol-% glycerol and/or oils, preferably up to 40 vol-% glycerol and/or oils, more preferably up to 30 vol-% glycerol and/or oils.

With regard to the polymeric membrane for use in the method as described herein, basically any microporous polymeric membrane may be used. Preferably, the polymeric membrane is selected from polymeric sulfone membranes, polyethylene membranes, polypropylene membranes, polyvinylidene difluoride membranes and polyacrylonitrile membranes. These membranes are advantageously used in biopharmaceutical, industrial and beverages filtration applications and are therefore preferred herein. It is further preferred that the polymeric membrane is a polymeric sulfone membrane selected from polysulfone, polyethersulfone, and polyarylsulfone. Preferably, the polymeric sulfone is polyethersulfone. The polymeric membrane as described herein may be a flat-sheet membrane or a hollow-fibre membrane since the method as described herein may be advantageously applied to both membrane types. Typically, the microporous polymeric membrane as used herein comprises a first surface, a second surface and an intermediate wall having a wall thickness disposed between the first surface and the second surface. Preferably, the membrane comprises at least one separation layer. The term "separation layer" as used herein has the meaning commonly used in the art, i.e. it describes the layer in the crosscut of the membrane which has the pores having the smallest diameter, i.e. the pores defining the separation properties of the membrane.

Since the polymeric membrane is modified on its surface, it is preferred that the separation layer is located within the wall disposed between the first surface and the second surface. The separation layer will then not be affected by the ultrasonic waves as used in the method as described herein.

Application of ultrasonic waves in step (ii) of the method according to the present disclosure may be effectuated by means commonly known to the skilled person for this purpose. Preferably, cavitation occurs in the liquid as described herein during step (ii). This was found to yield optimal results with regard to increasing the surface porosity and thus the filtration capacity of the respective polymeric membrane. For instance, ultrasonic baths already available for cleaning and mixing purposes may be employed herein. Also, there are ultrasonic waves generators commercially available which may be readily built in washing or rinsing baths already existing in membrane manufacturing lines. Preferably, applying ultrasonic waves in step (ii) comprises application of sound power of at least 20 W, preferably of at least 40 W, more preferably of at least 50 W. It is also preferred that applying ultrasonic waves in step (ii) comprises application of sound power of up to 10,000 W, preferably up to 9,000 W, and more preferably up to 8,000 W. Preferably, applying ultrasonic waves in step (ii) comprises application of sound power in the range of from 20 W to 10,000 W, preferably from 40 W to 9,000 W, and more preferably from 50 W to 8,000 W. While application of lower power will lead to only very slow or negligible surface modification, higher power input may damage the membrane in the liquid. Similarly, it is preferred that applying ultrasonic waves in step (ii) is carried out over a period of time of at least 30 s, preferably of at least 1 min, more preferably of at least 5 min. Preferably, applying ultrasonic waves in step (ii) is carried out over a period of time of up to 10 hours, preferably of up to 5 hours, more preferably of up to 2 hours. Accordingly, it is preferred that applying ultrasonic waves in step (ii) is carried out over a period of time in the range of from 30 seconds to 10 hours, preferably from 1 minute to 5 hours, more preferably from 5 minutes to 2 hours. Applying the ultrasonic waves less than 30 s will not yield acceptable modified membranes; and applying the ultrasonic waves longer than in the aforementioned ranges may lead to damage, even structural damage to the membranes.

The method may further comprise at least one additional washing step to remove potential debris from the membrane. This may be effectuated with water, or water containing adjuvants known in the art. Furthermore, the method as described herein may further comprise at least one drying step in order to dry the membrane. Both washing and drying steps are in most cases already part of the membrane production line. Of course, the method as described herein may be carried out as a stand-alone-solution, i.e. it may be carried out with already otherwise finished membranes, e.g. with membranes purchased for being surface-modified as disclosed herein. Drying the membranes may be carried out by commonly means used in the art for this purpose. For example, drying may be carried out exposing the membrane to an air flow, preferably warm air. Also, the membranes may be place in a vessel to which a vacuum is applied to.

The method according to the present disclosure facilitates the modification of the membrane surface. In particular, the modification of the membrane surface comprises an increase of the filtration capacity of the membrane. The filtration capacity, and the increase of the filtration capacity of the membrane achieved by the method described herein, may be determined, for example, by means of the coffee through put test as described in the experimental section of the present disclosure. Further, the method according to the present disclosure increases the surface porosity of the membrane treated. That is, the amount of pores in the surface(s) of the membrane is increased, and/or the size of the pores is increased. Both can be determined by scanning electron microscopy (SEM) or transmission electron micrograph (TEM) with appropriate magnifications, e.g. with 10,000:1, 20,000:1 or even 40,000:1.

Furthermore, the present disclosure provides a membrane, obtained by the method as described herein. Accordingly, the membrane is a polymeric microporous membrane having a modified surface. That is, the membrane has preferably an increased surface porosity and filtration capacity. Preferably, the filtration capacity was increased by at least 5%, preferably by at least 10%, more preferably of at least 15%. It is understood that all the materials and description discussed in conjunction with the method as described herein also apply to the membranes obtained by the method. That is, for example, the polymeric membrane is preferably selected from polymeric sulfone membranes, polyethylene membranes, polypropylene membranes, polyvinylidene difluoride membranes and polyacrylonitrile membranes. Also, it is preferred, for example, that the microporous polymeric membrane comprises a first surface, a second surface and an intermediate wall having a wall thickness disposed between the first surface and the second surface. Also, it is preferred that the microporous polymeric membrane comprises a separation layer, which is preferably located within the wall disposed between the first surface and the second surface.

Due to the improved filtration capacity and through-put, the membranes described herein are excellently suited for applications in the biopharmaceutical industry, for industrial applications, and applications in the production of beverages. Accordingly, the present disclosure provides a use of the membranes as described herein for the filtration of aqueous media, such as microfiltration and nanofiltration. "Microfiltration" and "ultrafiltration" have the meaning common in the art. Preferably, the use as described herein is filtration in the biopharmaceutical industry, filtration of beverages or waste water treatment.

The present disclosure may further be described by means of the following exemplary items:
1. A method for treating the surface of a microporous polymeric membrane, comprising
   (i) Immersing a microporous polymeric membrane in a liquid;
   (ii) Applying ultrasonic waves to the microporous polymeric membrane immersed in the liquid.
2. The method according to item 1, wherein the liquid is selected from organic liquids and/or water.
3. The method according to item 1 or item 2, wherein the liquid comprises water.
4. The method according to any one of the preceding items, wherein the liquid comprises essentially water.
5. The method according to any one of items 2 to 4, wherein the organic liquid is selected from organic solvents, glycerols and/or oils.

6. The method according to item 5, wherein the oil is selected from mineral oil, synthetic oil, vegetable oil, preferably olive oil, rape seed oil, sunflower seed oil, and/or linseed oil.
7. The method according to item 5 or item 6, wherein the liquid comprises water and glycerol.
8. The method according to any one of items 5 to 7, wherein the liquid comprises water and at least 1 vol-% glycerol and/or oils, preferably at least 2 vol-% glycerol and/or oils, and more preferably at least 5 vol-% glycerol and/or oils.
9. The method according to any one of items 5 to 8, wherein the liquid comprises water and up to 50 vol-% glycerol and/or oils, preferably up to 40 vol-% glycerol and/or oils, more preferably up to 30 vol-% glycerol and/or oils.
10. The method according to any one of the preceding items, wherein the polymeric membrane is selected from polymeric sulfone membranes, polyethylene membranes, polypropylene membranes, polyimide membranes, polyvinylidene difluoride membranes and polyacrylonitrile membranes.
11. The method according to item 10, wherein the polymeric membrane is a polymeric sulfone membrane selected from polysulfone, polyethersulfone, and polyarylsulfone.
12. The method according to item 11, wherein the polymeric sulfone is polyethersulfone.
13. The method according to any one of the preceding items, wherein the membrane is a flat-sheet membrane or a hollow-fibre membrane.
14. The method according to any one of the preceding items, wherein the microporous polymeric membrane comprises a first surface, a second surface and an intermediate wall having a wall thickness disposed between the first surface and the second surface.
15. The method according to any one of the preceding items, wherein the microporous polymeric membrane comprises a separation layer.
16. The method according to item 15, wherein the separation layer is located within the wall disposed between the first surface and the second surface.
17. The method according to any one of the preceding items, wherein applying ultrasonic waves in step (ii) comprises cavitation in the liquid.
18. The method according to any one of the preceding items, wherein applying ultrasonic waves in step (ii) comprises application of sound power of at least 20 W, preferably of at least 40 W, more preferably of at least 50 W.
19. The method according to any one of the preceding items, wherein applying ultrasonic waves in step (ii) comprises application of sound power of up to 10,000 W, preferably up to 9,000 W, and more preferably up to 8,000 W.
20. The method according to any one of the preceding items, wherein wherein applying ultrasonic waves in step (ii) comprises application of sound power in the range of from 20 W to 10,000 W, preferably from 40 W to 9,000 W, and more preferably from 50 W to 8,000 W.
21. The method according to any one of the preceding items, wherein applying ultrasonic waves in step (ii) is carried out over a period of time of at least 30 s, preferably of at least 1 min, more preferably of at least 5 min.
22. The method according to any one of the preceding items, wherein applying ultrasonic waves in step (ii) is carried out over a period of time of up to 10 hours, preferably of up to 5 hours, more preferably of up to 2 hours.
23. The method according to any one of the preceding items, wherein applying ultrasonic waves in step (ii) is carried out over a period of time in the range of from 30 seconds to 10 hours, preferably from 1 minute to 5 hours, more preferably from 5 minutes to 2 hours.
24. The method according to any one of the preceding items, wherein the ultrasonic waves are applied in a dose in the range of from 0.1 W/cm$^2$ to 10 W/cm$^2$, preferably from 0.2 to 8 W/cm$^2$, more preferably from 0.4 to 6 W/cm$^2$.
25. The method according to any one of the preceding items, wherein the method comprises modification of the membrane surface.
26. The method according to item 25, wherein the modification of the membrane surface comprises an increase of the filtration capacity of the membrane.
27. The method according to item 25 or item 26, wherein the method comprises increasing the surface porosity of the membrane.
28. The method according to any one of the preceding items, wherein the method is a method for increasing the surface porosity of the membrane.
29. The method according to any one of the preceding items, wherein the method is a method for increasing the through-put of a membrane.
30. A polymeric membrane, obtained by the method according to any one of the preceding items.
31. The membrane according to item 30, wherein the membrane is a microporous membrane.
32. The membrane according to item 30 or item 31, wherein the filtration capacity was increased by at least 5%, preferably by at least 10%, more preferably of at least 15%.
33. The membrane according to any one of items 30 to 32, wherein the polymeric membrane is selected from polymeric sulfone membranes, polyethylene membranes, polypropylene membranes, polyvinylidene difluoride membranes and polyacrylonitrile membranes.
34. The membrane according to item 33, wherein the polymeric membrane is a polymeric sulfone membrane selected from polysulfone, polyethersulfone, and polyarylsulfone.
35. The membrane according to item 34, wherein the polymeric sulfone is polyethersulfone.
36. The membrane according to any one of items 30 to 35, wherein the microporous polymeric membrane comprises a first surface, a second surface and an intermediate wall having a wall thickness disposed between the first surface and the second surface.
37. The membrane according to any one of items 30 to 36, wherein the microporous polymeric membrane comprises a separation layer.
38. The membrane according to item 37, wherein the separation layer is located within the wall disposed between the first surface and the second surface.
39. The membrane according to any one of items 30 to 38, wherein the membrane exhibits an increase surface porosity.
40. The membrane according to any one of items 30 to 39, wherein the membrane exhibits an increased filtration capacity.
41. The membrane according to any one of items 30 to 40, wherein the membrane exhibits an increased through-put.

42. Use of the membrane according to any one of items 30 to 41 for filtration of liquid media.
43. The use according to item 42, wherein the filtration comprises microfiltration, ultrafiltration or nanofiltration.
44. The use according to item 42 or item 43, wherein the use is filtration in the biopharmaceutical industry, filtration of beverages or waste water treatment.

EXAMPLES

Figure 1:
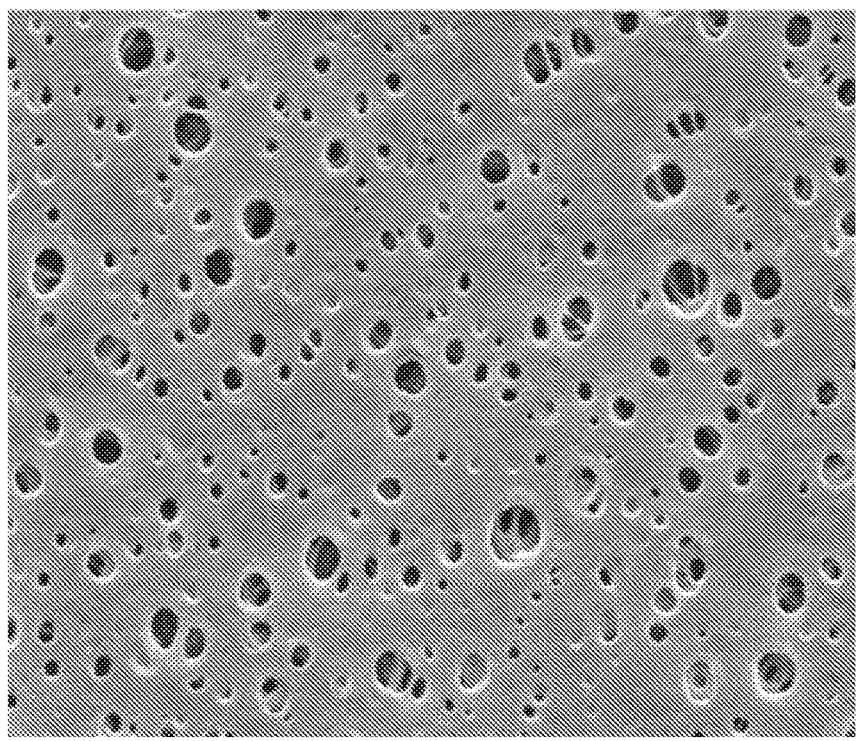
FIG. 1: SEM picture of 20000× magnification of the untreated roll side of a MicroPES 2FPH membrane (Comp. Ex. 1).
Figure 2:
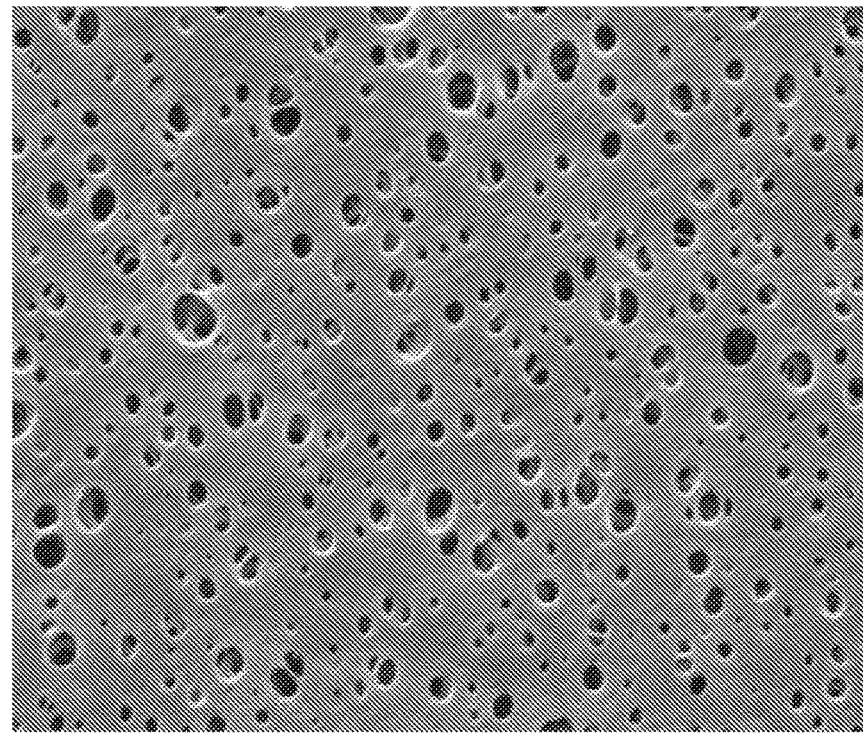
FIG. 2: SEM picture of 20000× magnification of the roll side of a MicroPES 2FPH membrane after the ultrasonic treatment as described in the experimental section (Ex. 1)

The present disclosure is further described without however wanting to limit the disclosure thereto. The following examples are provided to illustrate certain embodiments but are not meant to be limited in any way. Prior to that some test methods used to characterize materials and their properties will be described. All parts and percentages are by weight unless otherwise indicated.

Test Methods

Surface Porosity:

A small piece of membrane is prepared for SEM-analysis by applying a thin gold coating layer with a sputter device. The sample is placed within the measurement chamber of a common SEM and at least three images are taken from both sides of the sample using a BSED-detector that ensures high contrast between sample surface and pores. These images are uploaded to an image-analysis-software (e.g. "Scandium") where further data processing takes place. After setting a contrast threshold the software distinguishes between pores and polymeric surface area and differentiates the pore area into 10 discrete classes. This repeated three times per sample side provides a statistical value of surface porosity (pore-area divided by whole sample area) and furthermore a pore size deviation over the surface.

Volume Porosity:

A sample of at least 0.5 g of the membrane to be examined is dry weighed. The membrane sample is subsequently placed in a liquid that moistens the membrane material, however without causing swelling, for 24 hours such that the liquid penetrates into all pores. A silicone oil with a viscosity of 200 mPa s at 25° C. (Merck) is used. The permeation of liquid into the membrane pores is visually discernable in that the membrane sample changes from an opaque to a glassy, transparent state. The membrane sample is subsequently removed from the liquid, liquid adhering to the membrane sample is removed by centrifuging at approx. 1800 g, and the mass of the thus pretreated wet, i.e. liquid-filled, membrane sample is determined by weighing.

The volume porosity c is determined according to the following formula:

$$\text{Volume porosity } \varepsilon = \frac{(m_{wet} - m_{dry})/\rho_{liquid}}{(m_{wet} - m_{dry})/\rho_{liquid} + m_{dry}/\rho_{polymer}}$$

where:

$m_{dry}$=weight of the dry membrane sample after wetting and drying [g]
$m_{wet}$=weight of the wet, liquid-filled membrane sample [g]
$\rho_{liquid}$=density of the liquid used [g/cm$^3$]
$\rho_{polymer}$=density of the membrane polymer [g/cm$^3$]

Maximum Separating Pore:

The diameter of the maximum separating pore is determined by means of the bubble point method (ASTM No. 128-99 and F 316-03), for which the method described in DE-A-36 17 724 is suitable. Thereby, $d_{max}$ results from the vapor pressure $P_B$ associated with the bubble point according to the equation $$d_{max} = \sigma_B/P_B$$

where $\sigma_B$ is a constant that is primarily dependent on the wetting liquid used during the measurement. For H$_2$O, $\sigma_B$ is 2.07 µm·bar at 25° C.

Nominal Pore Size

The nominal pore size in the separating layer is determined by perm porometry according to ASTM F 316-03 with the PMI Advanced Porometer CFP-1020-APLC-GFR (PMI, Ithaca, NY, US).

Transmembrane Flow (Water Permeability):

From a roll of flat sheet membrane a rectangular piece is cut and placed within the circular shaped mounting of a measurement chamber. Once it is closed a circular piece of membrane with a defined surface area of 43.20 cm$^2$ is sealed within the chamber. After starting the measurement ultrafiltered and deionised water conditioned to 25° C. flows with a defined test pressure (approx. 0.6 bar) through the membrane. The filtrated water volume obtained over a measuring time of 1 minute, i.e. the permeate produced during the measurement, is determined gravimetrically or volumetrically.

The transmembrane flow TMF is calculated using formula (III)

$$TMF = \frac{V_W}{\Delta t \cdot A_M \cdot \Delta p} \left[ \frac{\text{ml}}{\text{cm}^2 \cdot \text{min} \cdot \text{bar}} \right] \quad (III)$$

where:

$V_W$=Water volume flowing through the membrane sample during the measuring time [ml]
$\Delta t$=Measuring time [min]
$A_M$=Area of the membrane sample exposed to the flow (normally 30 cm$^2$)
$\Delta p$=Pressure set during the measurement [bar]

Through Put Test

A circular piece of membrane is cut from a membrane roll and placed in a flat sheet membrane test cell. In a separate pressurized vessel a solution of 0.2 g±10 mg soluble coffee in 5000 ml deionized water is prepared under constant stirring.

After venting the test cell containing the flat sheet membrane the solution is pressed through it for 10 minutes while the filtrate flow is constantly measured gravimetrically.

The cumulated permeate mass after 10 min of filtration is defined as the Through put measured in g.

Membrane Substrate

As substrate MicroPES 2FPH has been chosen as decent candidate since the retentive layer of this type is localized not on the outer surface but appears to be in the inner matrix of the membrane.

Ultrasonic Device

A regular ultrasonic bath with adjustable power from Bandelin (Model DK 156 bp, 35 kHz, 180 W) has been used.

Treatment Medium

An aqueous solution of 10 wt-% glycerol has been used to tailor the effect on the membrane. This medium was suitable in combination with the existing bath since pure water yielded high cavitation even on lower setting. This solution showed lower tendency to create cavitation bubbles and was more suitable for carrying out the experiments.

Treatment Procedure

Sheets from a MicroPES 2FPH roll (3M Company) have been placed between to glass plates in order to even more reduce the intensity of cavitation on the membrane surface and immersed in the water/glycerol solution. The device was then turned on at 10% intensity for 10 min. The membrane samples were then visually inspected. Since no defects could visually be detected bubble point, TMF and coffee throughput have been measured at five equally treated samples. The results are referenced against five untreated samples from the same membrane roll.

The properties of the membranes are summarized in table 1.

TABLE 1

Properties of the membranes according to the examples and comparative examples. Example 1 is the membrane treated as described above, Comp. 1 is the untreated membrane.

|  | Ex. 1 | Comp. Ex. 1 |
|---|---|---|
| TMF [mL/cm² min bar] | 36.6 | 36.7 |
| Bubble point in water [bar] | 3.89 | 3.96 |
| Coffee through put [g] | 580 | 525 |

The experimental data showed that both TMF and bubble point were unaffected by the ultrasonic treatment. This demonstrates that the separation layer of the membrane as well as the general microporous structure of the membrane stayed intact during the ultrasonic treatment. The increase in throughput as demonstrated in the through put coffee test demonstrates that the surface porosity of the membrane was significantly increased by the ultrasonic treatment as described herein.

The invention claimed is:

1. A method for mechanically treating the surface of a microporous polymeric membrane, comprising:
   i. (i) Immersing a microporous polymeric membrane in a liquid;
   ii. (ii) Applying ultrasonic waves to the microporous polymeric membrane immersed in the liquid;
   Wherein the ultrasonic waves are applied in a dose in the range of from 0.1 W/cm² to 10 W/cm²;
   Wherein said method comprises increasing the surface porosity of the membrane such that the amount of pores in the surface of the membrane is increased, and/or the size of the pores is increased to obtain a microporous polymeric membrane having a modified surface;
   Wherein said microporous membrane comprises a first surface, a second surface, and an intermediate wall; and
   Wherein said microporous membrane comprises a separation layer wherein said separation layer is located within the wall disposed between the first surface and the second surface, the separation layer not affected by the ultrasonic waves.

2. The method according to claim 1, wherein the liquid is selected from organic liquids and/or water.

3. The method according to claim 1, wherein the polymeric membrane is selected from polymeric sulfone membranes, polyethylene membranes, polypropylene membranes, polyamide membranes, polyvinylidene difluoride membranes and polyacrylonitrile membranes.

4. The method according to claim 1, wherein the microporous polymeric membrane comprises a first surface, a second surface and an intermediate wall having a wall thickness disposed between the first surface and the second surface.

5. The method according to claim 1, wherein applying ultrasonic waves in step (ii) comprises generation of cavitation in the liquid.

6. The method according to claim 1, wherein applying ultrasonic waves in step (ii) comprises application of sound power of at least 20 W.

7. The method according to claim 1, wherein applying ultrasonic waves in step (ii) comprises application of sound power of up to 10,000 W.

8. The method according to claim 1, wherein applying ultrasonic waves in step (ii) is carried out over a period of time of at least 30 s.

9. The method according to claim 1, wherein the ultrasonic waves are applied in a dose in the range from 0.2 to 8 W/cm².

10. The method according to claim 1, wherein the method comprises modification of the membrane surface.

11. The method according to claim 10, wherein the ultrasonic waves are applied in a dose in the range of from 0.4 to 6 W/cm².

12. A polymeric membrane, obtained by the method according to claim 1.

13. The membrane according to claim 12, wherein a filtration capacity was increased by at least 5%.

14. The method according to claim 1, wherein said ultrasonic waves increased the filtration capacity of said microporous membrane by at least 5%, preferably by at least 10%, more preferably by at least 15%.

* * * * *